US010013947B2

United States Patent
Ek et al.

(10) Patent No.: US 10,013,947 B2
(45) Date of Patent: Jul. 3, 2018

(54) SWITCHABLE PRIVACY DISPLAY BASED ON STRIPED POLARIZER

(71) Applicant: Sony Corporation, Tokyo (JP)

(72) Inventors: Martin Ek, Lund (SE); Alexander Hunt, Tygelsjö (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 0 days.

(21) Appl. No.: 14/611,311

(22) Filed: Feb. 2, 2015

(65) Prior Publication Data

US 2016/0225337 A1    Aug. 4, 2016

(51) Int. Cl.
| | | |
|---|---|---|
| G09G 5/00 | (2006.01) | |
| G02B 5/30 | (2006.01) | |
| G02B 27/28 | (2006.01) | |
| G09G 3/00 | (2006.01) | |
| H04N 13/04 | (2006.01) | |

(52) U.S. Cl.
CPC .......... *G09G 5/003* (2013.01); *G02B 5/3025* (2013.01); *G02B 27/288* (2013.01); *G09G 3/00* (2013.01); *H04N 13/0434* (2013.01); G09G 2320/068 (2013.01); G09G 2320/0613 (2013.01); G09G 2320/08 (2013.01); G09G 2354/00 (2013.01);
(Continued)

(58) Field of Classification Search
None
See application file for complete search history.

(56) References Cited

U.S. PATENT DOCUMENTS 1,422,527 A * 7/1922 Berger ................. G02B 27/06
 116/DIG. 41
4,973,087 A * 11/1990 Balogh ................. B42D 15/04
 283/117
(Continued)

FOREIGN PATENT DOCUMENTS

EP    2 611 167    7/2013

OTHER PUBLICATIONS

Invitation to Pay Additional Fees for International Application No. PCT/US2015/037714 dated Sep. 18, 2015.
(Continued)

*Primary Examiner* — Srilakshmi K Kumar
*Assistant Examiner* — Karin Kiyabu
(74) *Attorney, Agent, or Firm* — Tucker Ellis LLP (57) ABSTRACT

A computing device includes a display having a striped polarizer, the striped polarizer includes a set of sub-areas having a first polarization interspersed between another set of sub-areas having a second polarization. The sub-areas are arranged to provide an alternating polarization across a dimension of the display. The computing device may be configured to receive information specifying a privacy display mode, select a privacy display mode based upon the received information, receive input display data configured to represent information for display, generate, in response to selecting the privacy display mode, output display data by inverting a first portion of pixels in the input display data which are associated with a first polarization, and not inverting a second portion of pixels in the input display data which are associated with a second polarization, and provide the output display data to a display.

20 Claims, 6 Drawing Sheets

(52) U.S. Cl.
CPC . *G09G 2358/00* (2013.01); *H04N 2013/0463* (2013.01)

(56) References Cited

U.S. PATENT DOCUMENTS

| | | | | | |
|---|---|---|---|---|---|
| 5,805,250 | A | * | 9/1998 | Hatano | G02B 27/26 348/E13.033 |
| 5,963,371 | A | * | 10/1999 | Needham | G02B 27/2264 348/E13.022 |
| 7,209,557 | B2 | * | 4/2007 | Lahiri | G06F 21/84 380/54 |
| 8,935,798 | B1 | * | 1/2015 | Smith | G06F 17/30902 709/219 |
| 9,250,449 | B2 | * | 2/2016 | Xu | G02B 27/2242 |
| 9,423,602 | B1 | * | 8/2016 | Dolgoff | G02B 21/22 |
| 2002/0101988 | A1 | * | 8/2002 | Jones | G09C 5/00 380/54 |
| 2003/0118183 | A1 | * | 6/2003 | Struyk | G06F 21/84 380/213 |
| 2005/0046882 | A1 | * | 3/2005 | Kobayashi | H04N 1/6022 358/1.9 |
| 2007/0188711 | A1 | * | 8/2007 | Sharp | G02F 1/133621 353/8 |
| 2007/0263003 | A1 | * | 11/2007 | Ko | H04N 13/0438 345/502 |
| 2009/0059173 | A1 | * | 3/2009 | Azor | G03B 21/26 353/20 |
| 2009/0067156 | A1 | * | 3/2009 | Bonnett | G02B 6/0043 362/97.2 |
| 2010/0085373 | A1 | * | 4/2010 | Miyasaka | G09G 5/00 345/589 |
| 2010/0241691 | A1 | * | 9/2010 | Savitzky | G06F 15/16 709/203 |
| 2011/0102563 | A1 | * | 5/2011 | Johnson, Jr. | H04N 13/0431 348/60 |
| 2011/0199402 | A1 | | 8/2011 | Ishii et al. | |
| 2012/0293747 | A1 | | 11/2012 | Sharp et al. | |
| 2013/0103943 | A1 | * | 4/2013 | Hirsch | G09C 5/00 713/168 |
| 2013/0169765 | A1 | * | 7/2013 | Park | H04N 13/04 348/54 |
| 2013/0222822 | A1 | * | 8/2013 | Kurtz | G03B 35/14 358/1.9 |
| 2013/0222904 | A1 | * | 8/2013 | Kurtz | G03C 9/06 359/463 |
| 2013/0222905 | A1 | * | 8/2013 | Kurtz | G02B 27/2207 359/464 |
| 2014/0179227 | A1 | * | 6/2014 | Nousiainen | H04W 84/18 455/41.2 |
| 2014/0240338 | A1 | * | 8/2014 | Patino | G09G 3/20 345/589 |
| 2014/0366123 | A1 | * | 12/2014 | DiBona | G06Q 10/00 726/16 |
| 2015/0116212 | A1 | * | 4/2015 | Freed | G09G 5/00 345/156 |
| 2015/0138059 | A1 | * | 5/2015 | Large | G02F 1/1323 345/102 |
| 2016/0225343 | A1 | * | 8/2016 | Ek | G09G 5/026 |

OTHER PUBLICATIONS

International Search Report and Written Opinion from corresponding International Application No. PCT/US2015/037714, dated Dec. 8, 2015.

* cited by examiner

SWITCHABLE PRIVACY DISPLAY BASED ON STRIPED POLARIZER

BACKGROUND INFORMATION

Displays having a wide field of view may be considered advantageous when a user wishes to share the contents of the display with others. However, in some situations, when the contents of the display are personal or confidential, such displays can present privacy concerns. Conventional approaches to improve privacy include placing a filter onto the surface of the display which can reduce unsupervised viewing from others, but may also reduce to quality of the images presented to the user. Moreover, because such filters are typically not removed once fixed to the display, they may indiscriminately act on all types of display data, thus unnecessarily impact the presentation of non-private information to the user.

SUMMARY OF THE INVENTION

According to one aspect, a method for selectively displaying content on a computing device is presented. The method may include receiving information to specify a privacy display mode; and selecting the privacy display mode based upon the received information; receiving input display data configured to represent information for display. The method may further include generating, in response to selecting the privacy display mode, output display data by inverting a first portion of pixels in the input display data which are associated with a first polarization, and not inverting a second portion of pixels in the input display data which are associated with a second polarization. The method may further include providing the output display data to a display.

In another aspect, a computing device for selectively displaying content on a computing device is presented. The computing device may include a display comprising a striped polarizer, wherein the striped polarizer comprises a plurality of first sub-areas having a first polarization interspersed between a plurality of second sub-areas having a second polarization, wherein each first sub-area is located adjacent to each second sub-area to provide an alternating polarization across a dimension of the display. The computing device may further include a memory configured to store instructions, and at least one processor, coupled to the display and the memory. The at least one processor may be configured to execute the instructions stored in the memory to: receive information specifying a privacy display mode, select a privacy display mode based upon the received information, receive input display data configured to represent information for display, generate, in response to selecting the privacy display mode, output display data by inverting a first portion of pixels in the input display data which are associated with a first polarization, and not inverting a second portion of pixels in the input display data which are associated with a second polarization, and provide the output display data to a display.

In yet another aspect, a computing device for selectively displaying content on a computing device is presented. The computing device may include a display comprising a striped polarizer, wherein the striped polarizer comprises a plurality of first sub-areas having a first polarization interspersed between a plurality of second sub-areas having a second polarization, wherein each first sub-area is located adjacent to each second sub-area to provide an alternating polarization across a dimension of the display. The computing device may further include a memory configured to store instructions, and logic configured to: receive information specifying a privacy display mode, select a privacy display mode based upon the received information, receive input display data configured to represent information for display, generate, in response to selecting the privacy display mode, output display data by inverting a first portion of pixels in the input display data which are associated with a first polarization, and not inverting a second portion of pixels in the input display data which are associated with a second polarization, and provide the output display data to a display.

DETAILED DESCRIPTION

The following detailed description refers to the accompanying drawings. The same reference numbers in different drawings identify the same or similar elements.

A computing device may include display technologies having a wide field of view. A wide field of view can provide clear visibility of the contents of the display over large angles measured from a vector perpendicular to the viewing surface of the display. Such technologies may include any type of display, such as, for example, Liquid Crystal Display (LCD), Light Emitting Diode (LED), and/or Organic LED (OLED). In many instances, a wide field of view may be a design goal for improving visibility of the display. However, when the computing device is being used in close proximity to other individuals, a user may wish to prevent others from monitoring information being displayed. Such situations may commonly arise, for example, during travel over public transportation and common air carriers, when dining in restaurants, relaxing in public parks, passing time in a waiting room or a classroom, etc.

In such situations, embodiments presented can provide a form of switchable privacy protection, where the computing device may enter a privacy mode, either automatically based on various factors, or manually at the behest of a user. Upon displaying sensitive material, the computing device may switch from a non-privacy display mode to a privacy display mode, where the contents of the display may only be viewed by a user who is wearing a specific type of polarized glasses.

As used herein, the term "polarized glasses" may be broadly defined to include any type of viewing device permitting a wearer to properly interpret the contents of the display when the computing device is in the privacy display mode. The polarized glasses may be any type of optical device configured to polarize incoming light in coordination with the polarizations of a striped polarizer associated with the display. The polarized glasses may include polarized optical components for both eyes, such as conventional glasses or clip-on accessories which may be removably attached to prescription glasses. However, in some embodiments, the glasses may only cover one eye with a polarized optical component (e.g., a monocle). Other embodiments may include headsets, one or more contact lens, or glasses forgoing the use of temples which are supported by a user's hand instead of being worn, either using a handle (similar to opera glasses) or a portion of the frame.

The striped polarizer may be a component associated with the display of the computing device. The striped polarizer may be integrated into an existing polarizer which may be used in the fabrication of the display, or may be added on after a display has been partially assembled (e.g., an additional layer to an existing polarizer) or fully assembled (e.g., placed fixedly over a completed display). The striped polarizer includes alternating sub-areas having opposite polarizations, each sub-area extending over an entire dimension of at least the viewable display (e.g., in full columns or full rows). In the opposite dimension, the sub-area may extend over a single pixel, however, in some embodiments, it may extend over multiple pixels.

As used herein, the term "opposite polarization" may refer to a polarization which is the inverse of another polarization. For example, the opposite polarization to a vertical polarization is a horizontal polarization, and the opposite polarization of a "right handed" circular polarization (which may be referred to as "S") would be a "left handed" circular polarization (which may be referred to as "P").

Figure 1:
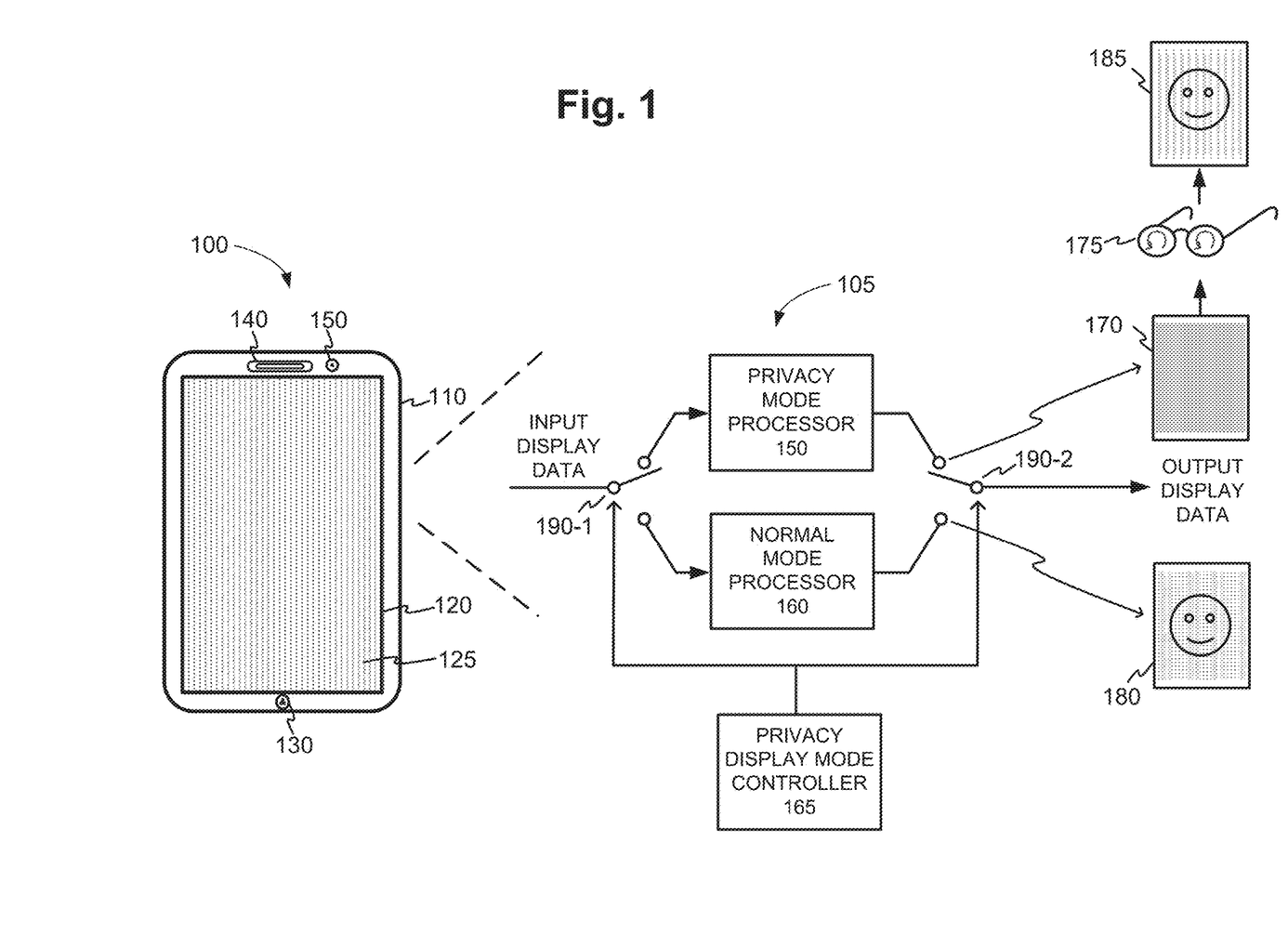
FIG. 1 is a diagram showing an exemplary computing device which may utilize a display having selectable privacy modes.

FIG. 1 is a diagram showing an exemplary computing device which may utilize a display having selectable privacy modes. Computing device 100 may include any device with a display, such as a mobile phone, a smart phone, a phablet device, a tablet computer, a laptop computer, a personal computer, a personal digital assistant (PDA), a media playing device, and/or another type of portable communication device. As shown in FIG. 1, computing device 100 may include a processor 105, a housing 110, a display 120 having a striped polarizer 125, a microphone 130, a speaker 140, and a camera 150. Further shown are representations of exemplary functionalities which may be performed by processor 105 during the operations for switchable privacy display modes. The functionalities performed by processor 105 may include privacy mode processing 150, normal mode processing 160, privacy display mode control 165, and switching 190-1, 190-2 (herein referred to collectively as "switching 190" and individually as switching "190-x").

Housing 110 may enclose computing device 100 and may protect the components from the outside environment. Display 120 may be a touchscreen, and thus incorporate a display device that includes an input device configured to detect a user's touch. For example, display 120 may include a liquid crystal display (LCD), an electronic ink display (e.g., an electrophoretic display), an electroluminescent display, and/or another type of display device. Display 120 may further include a striped polarizer 125 which includes a set of sub-areas having a polarization interspersed between a second set of sub-areas having an opposite polarization, where each sub-area is adjacently placed to a neighboring sub-area having an opposite polarization. In one direction, the sub-areas may extend across the entire visible surface of display 120, and in the other direction, extend over a much smaller extent, such as one or more pixels. The actual number of pixels may vary depending upon the type of screen, its resolution, and the distance from which it may be viewed. In practice, the number of pixels should be below the visual acuity of an average viewer's ability to discern individual pixels, such that the number of individual pixels are "averaged" by the eye of a user (or more accurately, the human visual perception system of the user) and thus perceived as being a "single pixel." In the embodiment shown in FIG. 1, the striped polarizer 120 is organized into columns extending over the entire vertical dimension of display 120, and extending in the horizontal dimension over a single pixel, with one set of sub-areas having a right handed circular polarization, and another set of sub-areas having a left handed polarization. Further details of the striped polarizer will be discussed in relation to FIG. 2. When configured as touchscreen display, display 120 may further include a set of touch sensors, such as a set of capacitive sensors (e.g., surface capacitive sensors, projected capacitive touch sensors, etc.), a set of resistive sensors (e.g., analog resistive sensors, digital resistive sensors, etc.), a set of optical sensors, etc.

Further referring to computing device 100, microphone 130 may function as an input device that receives audio signals and converts the received audio signals to electrical signals. Speaker 140 may function as an output device that receives electrical signals and generates audio signals based on the received electrical signals. Camera 150 may be any type of sensor capable of generating image and/or video data. Computing device 100 may include additional sensors that are not shown in FIG. 1.

An aspect of the functionality of computing device 100 with respect to privacy display mode switching may be explained by the data flow associated by the functional blocks within processor 105. Input display data may undergo privacy mode processing 150 or normal mode processing 160, depending upon switching 190. The input display data may be generated by applications which produce text, graphics, video/movie data, etc. Switching 190 may be governed by privacy display mode control 165, which may switch privacy display mode processing manually based on the commands provided by the user and/or commands automatically generated by computing device 100 according to various operational and/or environmental conditions. Accordingly, depending upon user commands and/or other conditions, privacy display mode control 165 may select the appropriate form of processing for the input display data, and provide the output display data to the display. When privacy display mode control 165 configures switching 190 to perform normal mode processing 160 on the input display data, the input display data may be processed in a conventional manner (e.g., reformatting, filtering, color correction, brightness correction, gamma correction, etc.) producing output display data 180, which may display the information represented in the input display data on display 120.

Alternatively, when privacy display mode control 165 configures switching 190 to perform privacy mode processing 150 on input display data, the input display data may be processed into output display data 170 having an obfuscated form. When a person views output display data 170 without polarized glasses 175, the information conveyed in the input display data may be obscured so as to be unintelligible in the output display image data, so that the output data cannot be interpreted by the viewer. For example, the entire display (or a portion thereof) may appear as a gray uniform presentation. However, when a person views output display data 170 through polarized glasses 175, a filtering is applied such that the information content in output display data 170 is presented in a viewable or understandable form 185, thus making the information content in the input display data interpretable only by the person wearing polarized glasses 170. Privacy mode processing 150 may alter the input display data by inverting the values of various pixels associated with sub-areas having a polarization in striped polarizer 125, and does not invert pixel values associated with sub-areas having an opposite polarization in striped polarizer 125. In some embodiments, privacy mode processing 150 may also perform other processing operations, such as, for example, reformatting, filtering, color correction, brightness correction, gamma correction, etc. Additionally, in some instances, the privacy mode processing 150 may involve other processing, which may include: identifying the states of neighboring pixels in adjacent sub-areas for determining which pixels to invert; gamma processing; resolution processing using spatial image filtering, smoothing, etc.

Although FIG. 1 shows exemplary components of computing device 100, in other implementations, computing device 100 may include fewer components, different components, differently arranged components, or additional components than depicted in FIG. 1. Additionally or alternatively, one or more components of computing device 100 may perform functions described as being performed by one or more other components of computing device 100.

Figure 2A:
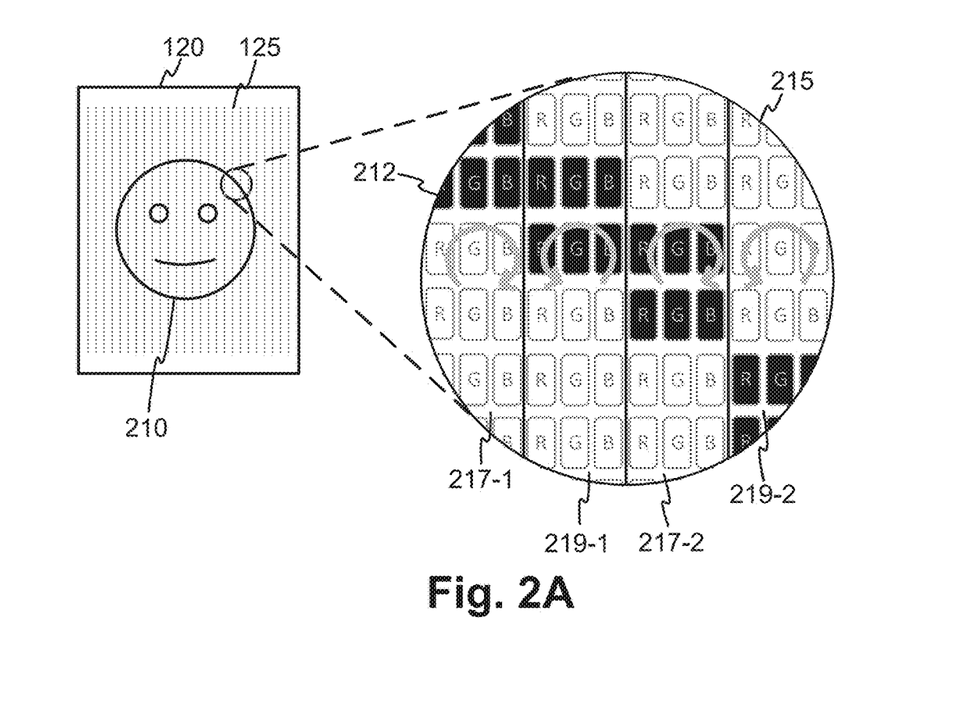
FIG. 2A is a diagram illustrating an exemplary display operating in a non-privacy mode.
Figure 2B:
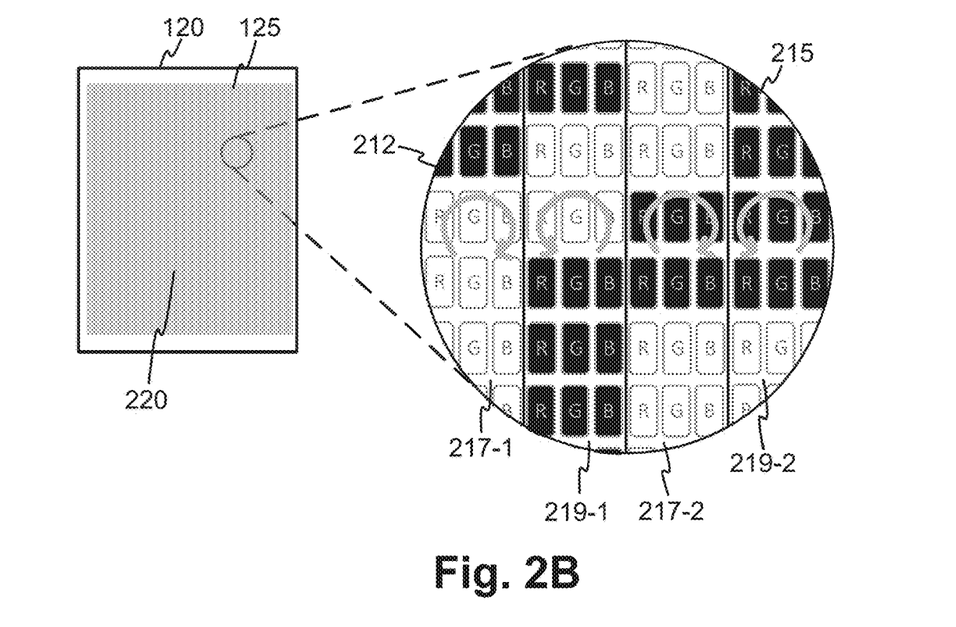
FIG. 2B is a diagram of an exemplary display operating in a privacy mode when viewed without polarized glasses.
Figure 2C:
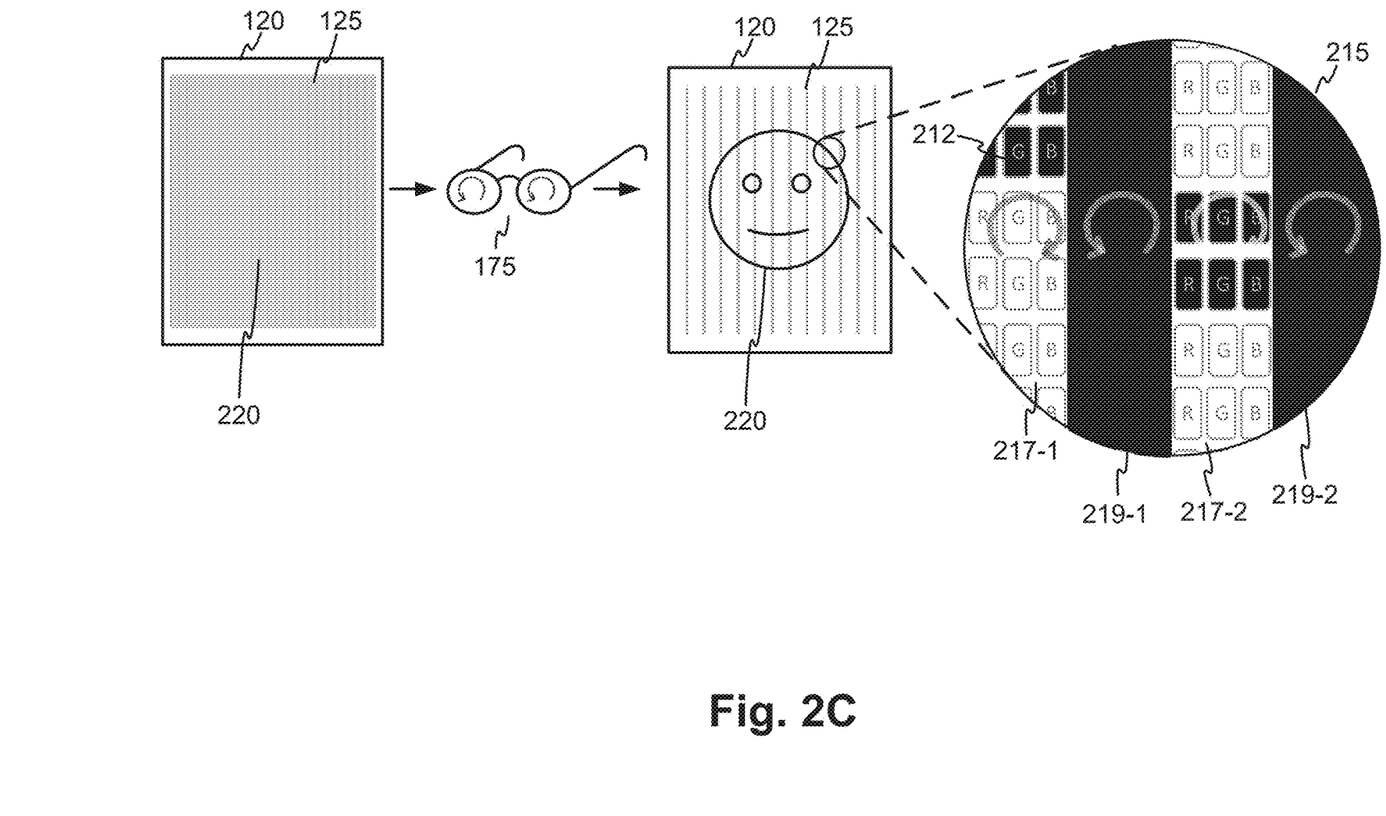
FIG. 2C is a diagram of an exemplary display operating in a privacy mode when viewed with polarized glasses.

FIGS. 2A-2C illustrate exemplary views of output display data on display 120 along with striped polarizer 125. FIG. 2A is a diagram illustrating display 120 operating in a normal (non-privacy) display mode presenting output display data 210 which underwent normal mode processing 160. In FIGS. 2A-2C, output image 210 is represented as a 1-bit binary image for ease of explanation, however any type of grayscale or color image, using any color space to represent pixel values, may be used. An expanded view 215 of output display data 210 is shown, showing individual pixels 212 which represent output display data 210. Also shown in expanded view 215 are sub-areas 217 (herein referred to plurally as "sub-areas 217" and individually as "sub-areas 217-x") making up striped polarizer 125 which have a right handed (e.g., clockwise) circular polarization. Also shown are sub-areas 219 (herein referred to plurally as "sub-areas 219" and individually as "sub-areas 219-x") of striped polarizer 125 having a left handed (e.g., counter-clockwise) circular polarization. The use of circular polarization is merely exemplary, and other polarizations (e.g., linear) may be used, as long as adjacent sub-areas have opposite polarizations. As shown in FIGS. 2A-2C, sub-areas 217 and 219 may correspond to columns having a width of a single pixel; however, in other examples, these columns may extend over more than one pixel. Alternatively, in other embodiments, sub-areas 217 and 219 may correspond to rows having a height of one or more pixels.

Further referring to FIG. 2A, output display data 210 shown in non-privacy display mode is presented at full resolution without inverting any pixels of the input display data. Accordingly, each column of pixels may be viewed by the user through striped polarizer 125, and the information content in input display data may be conveyed in the output display data and be clearly interpreted based on viewing the output image data 210 on display 120 without using polarized glasses 175. In other words, the pixels associated with sub-areas 217 and sub-areas 219 combine to form an interpretable image representing the information content provided in the input display data. Given the computing device 100 is in normal display mode, the information content may be seen by the user without the use of polarized glasses 175. Accordingly, in normal display mode, the totality of pixels provide a visual representation of output image data which conveys information that is interpretable by a person without using polarized glasses 175.

FIG. 2B is a diagram illustrating display 120 operating in a privacy display mode presenting output display data 220, which underwent privacy mode processing 150, when viewed without polarized glasses 175. Output display data 210 shown in privacy display mode is presented at full resolution, however pixels in the columns of sub-areas 219 have been inverted from their original values provided by the input display data. Thus, in a simple case which requires very little processing overhead, for the binary image example shown in FIG. 2B, pixels within sub-areas 219 may be assigned the inverse value of neighboring pixels in the adjacent sub-areas 217 to the left of each sub-area 219. Alternatively, a similar approach may be used by assigning pixels in sub-areas 219 the inverse value of neighboring pixels in sub-areas 217 found to the right of each sub-area 219 (not shown). In another embodiment, particularly with gray scale and color input display data, the inverted pixels in 219 may be identified by considering all of the neighboring pixels in adjacent columns 217, and performing averaging or other filtering to generated the inverted pixels in sub-areas 219. In another embodiment, using a very simple approach, neighboring pixels may not be considered during the inversion process, and the inverse pixels in sub-area 219 may be determined by simply assigning pixels which were originally white in the input display data to black, and pixels assigning which were originally black in the input display data to white.

The pixels in sub-areas 217 do not undergo an inversion process. Accordingly, the pixels may be viewed by the user through striped polarizer 125, and the information content from the input display data may be obfuscated when viewing the output image data 220 on display 120 without using polarized glasses 175. This is the result of the viewer's eyes (or more accurately, the viewer's human visual perception system which includes visual processing performed by the brain) averaging the inverted pixels associated with sub-areas 219 with the non-inverted pixels associated with sub-areas 217, resulting in what appears to be a gray image 220 on display 120. Thus, the pixels associated with sub-areas 217 and sub-areas 219 combine to form an image which is not interpretable by a viewer, and thus does not convey the information content provided in the input display data. Given the computing device 100 in FIG. 2B is in privacy display mode, the information content may not be interpreted by anyone without the use of polarized glasses 175.

FIG. 2C is a diagram illustrating display 120 operating in a privacy display mode presenting output display data 220, which underwent privacy mode processing 150, when viewed with polarized glasses 175. When output display data 220 presented on display 120 is viewed through polarized glasses 175, the information content in output display data 220 becomes interpretable by the wearer of polarized glasses 175. The information becomes interpretable because polarized glasses 175 filter out pixels corresponding to alternate polarizations in striped polarizer 125, which are opposite to the polarization of the lenses in polarized glasses 175. The filtering effect of polarized glasses 175 prevents the viewer from simultaneously viewing all of the pixels in output display data 220, and thus prevents the eye of the viewer from averaging pixels that were inverted with pixels that were not inverted. By preventing the averaging performed by the human visual perception system, the information content in output display data 220 is no longer obscured, and may be interpreted only by the viewer wearing polarized glasses 175.

An example of the filtering effect of polarized glasses 175 is shown in expanded view 215. Sub-areas 217 have a right-handed circular polarization, which matches the polarization of the exemplary polarized glasses 175 shown in FIG. 2C (note that the lenses in polarized glasses 175 also have right handed circular polarization viewed from the perspective of the wearer). Sub-areas 219 have left handed circular polarization, which is the opposite polarization of the lenses in polarized glasses 175. When the wearer of polarized glasses 175 views output data 220 on display 120, pixels associated sub-areas 219 are filtered out, and the wearer may only see pixels associated with sub-areas 217. By blocking out sub-areas 219 corresponding to pixels which were inverted by privacy mode processing 150, the information content in output display data becomes interpretable, because the eye may no longer average the adjacent sub-areas together. However, the images viewed through the polarized glasses 175 are seen at a reduced resolution and/or brightness (i.e., luminance), based on the filtered pixels in sub-areas 219. However, by controlling the size of sub-areas 219, the quality of the images presented in the output display data may be reasonably maintained.

It should be noted that both lens of polarized glasses 175 have the same polarization, and are unlike conventional 3-D glasses that have lenses with different polarizations. Thus, in some embodiments, a user could, if desired, only use a single lens over one eye to interpret the information content of output display data 220 when in privacy display mode.

In the example shown in FIG. 2C, the entire display 120 is obscured when output display data 220 is viewed without polarized glasses 175. Alternatively, in other embodiments, privacy mode processing 150 may process input image data so only a portion of output display data 220 is obscured when computing device 100 is in privacy display mode (i.e., only of subset of the contents of display 120 are obscured when viewed without polarized glasses 175). Obscuring a portion of the display may be useful when only small areas of display 120 present sensitive information (such as, for example, fields in forms which request a user to fill in private information, such as banking information, company-private information, addresses, phone numbers, medical information, etc.)

Additionally, the examples in FIGS. 2A-2C describe the output pixel formats being as 1-bit binary images. It should be noted that this not a limitation of the embodiments of the invention, but only provided for ease of explanation. Any type of image data may be used, such as color images using any color space or gray scale images in any format. When using color images, complementary colors may be used when inverting pixels. For example, if an RGB color space is used, a pixel having a specific red value may be inverted using the appropriate values of green and blue (cyan); a pixel having a specific green value may be inverted using the appropriate values of red and blue (magenta), and a pixel having a specific blue value may be inverted using the appropriate values of red and green (to produce yellow). When using grayscale images, pixel values may be inverted by subtracting a given pixel value from a maximum grayscale value in the format in which pixel data is represented. For example, if grayscale data is represented using byte data (8-bit values), a grayscale pixel having a value of X may be inverted by replacing the pixel with a value of 255-X.

Figure 3:
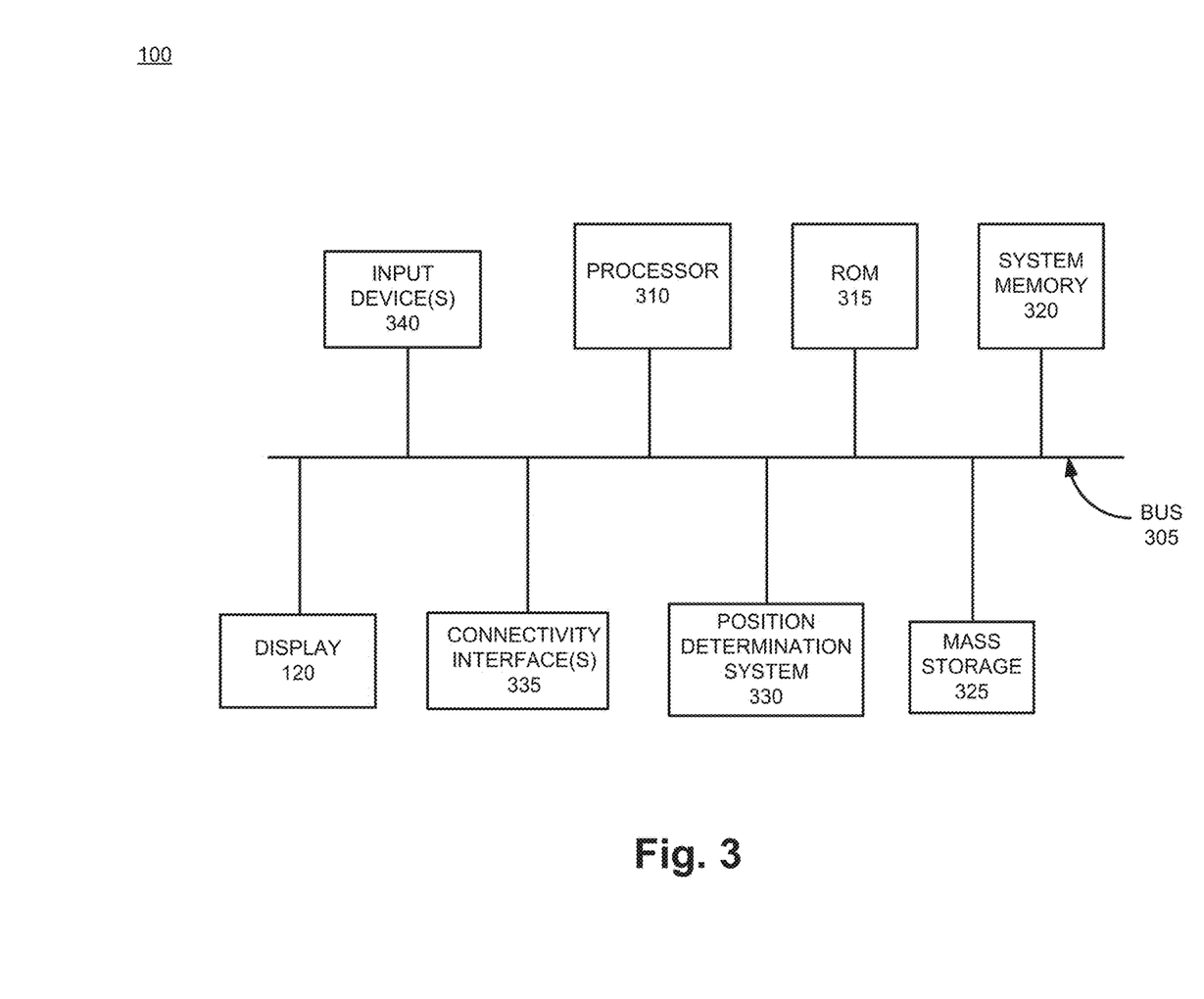
FIG. 3 is a diagram illustrating an exemplary components of the computing device of FIG. 1.

FIG. 3 is a diagram illustrating an exemplary components of computing device 100 shown in FIG. 1. As shown in FIG. 3, computing device 100 may include a processor 310, a Read Only Memory (ROM) 315, system memory 320, mass storage 325, a position determination system 330, connectivity interface(s) 335, input device(s) 340, and display 120. The components may be interconnected and communicate data and commands over a bus 345.

Processor 310 may include a processor, microprocessor, or processing logic that may interpret and execute instructions. System memory 320 may include a random access memory (RAM) or another type of dynamic storage device that may store information and instructions for execution by processor 310. ROM 315 may include a ROM device or another type of static storage device that may store static information and instructions for use by processor 310. Mass storage 325 may include a solid state drive, a magnetic drive, and/or an optical drive.

Display 120 may be any type of display and/or touchscreen as described above in reference to FIG. 1 configured to facilitate a privacy display mode. Display 120 may include a conventional display and striped polarizer 125. Striped polarizer 125 may include a plurality of sub-areas 217 having a first polarization interspersed between a plurality of second sub-areas 219 having a second polarization. Each first sub-area 217 may be placed adjacent to each second sub-area 219 to provide an alternating polarization across a dimension of display 120. In an embodiment, each first sub-area 217 and each second sub-area 219 may extend substantially over a vertical dimension of display 120, and extend at least one pixel in a horizontal dimension, thus forming columns across display 120. In another embodiment, each first sub-area 217 and each second sub-area 219 may extend substantially over a horizontal dimension of display 120, and extend at least one pixel in a vertical dimension, thus forming rows across display 120. The first polarization may polarized in a first direction, and the second polarization is polarized in a direction opposite to the first direction. The polarizations may be, for example, vertical, horizontal, linear (at an arbitrary degree), and/or circular. Striped polarizer 125 may be included in the display during manufacturing as an additional component, for example, striped polarizer 125 may be bonded onto an existing polarizer in display 120. Alternatively, striped polarizer 125 may be built into display 120 by modifying an existing component, such as, for example, by modifying a conventional exterior polarizing layer to include striped polarizations.

Display 120 may include a variety of technologies, such as, for example, Active Matrix Organic Light Emitting Diodes (AMOLED), active or passive matrix LCDs of any variety (e.g., Twisted Nematic (TN), In-Plane Switching (IPS), and/or Advanced Fringe Field Switching (AFFS), Vertical Alignment (VA), etc.). Display 120 may be fabricated to present a wide field of view in normal mode, and also may provide a wide viewing angle for the user when wearing polarized glasses 175 when computing device 100 is in privacy mode.

Input device(s) 340 may include one or more mechanisms that permit an operator to input information to computing device 100, such as, for example, a keypad or a keyboard, a microphone 130, voice recognition, components for a touchscreen, camera 150 and/or biometric mechanisms, etc. In an embodiment, computing device 100 may use camera 150 to determine if a user is wearing polarized glasses 175, and automatically enter the privacy display mode, if camera 150 determines that the user is wearing polarized glasses 175. Conversely, once the user removes polarized glasses 175, camera 150 may detect the absence of polarized glasses 175, permitting computing device 100 to automatically exit the privacy display mode. In another embodiment, polarized glasses 175 may be identified by computing device 100 as to their polarization type to advise the user whether the polarized glasses are compatible with striped polarizer 125. If the glasses are not compatible, computing device 100 may warn the user of the compatibility prior to entering the privacy display mode. The identification may be based on recognizing the shape of polarized glasses 175, and/or decoding information physically associated with polarized glasses 175 (e.g., a Quick Response (QR) code on the frames of polarized glasses or coding invisibly embedded in the lenses).

Connectivity interface(s) 335 may include any transceiver mechanism that enables computing device 100 to communicate with other devices and/or systems. For example, connectivity interface(s) 335 may include mechanisms for communicating with another device or system via a network, such as cellular network (e.g., Long Term Evolution (LTE), LTE Advanced, etc.). Connectivity interface(s) 335 may include a transceiver that enables computing device 100 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Connectivity interface(s) 335 may include a transmitter that converts baseband signals to radio frequency (RF) signals and/or a receiver that converts RF signals to baseband signals. Connectivity interface(s) 335 may be coupled to an antenna assembly (not shown) for transmitting and receiving RF signals.

Connectivity interface(s) 335 may further include a logical component that includes input and/or output ports, input and/or output systems, and/or other input and output components that facilitate the transmission of data to other devices. For example, connectivity interface(s) 335 may include a network interface card (e.g., Ethernet card) for wired communications and/or a wireless network interface (e.g., a WiFi) card for wireless communications. Connectivity interface(s) 335 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

In an embodiment, connectivity interface(s) 335 may be used to have computing device automatically go into privacy display mode by wirelessly detecting a second computing device within a specified distance of computing device 100. In response to such a detection, processor 100 would enable the privacy display mode. In such an event, the user would notice that display 120, or parts thereof, would be uninterpretable (appearing as a uniform gray) which would serve as a signal to put on privacy glasses 175. Moreover, connectivity interface(s) 335 may also be configured to permit computing device 100 to identify polarized glasses 175, based, for example, on an RF ID chip embedded therein. Computing device 100 could alert the user based on the identification whether polarized glasses 175 are compatible with striped polarizer 125 prior to entering privacy display mode.

Position determination system 330 may include one or more systems that provide position data in an absolute reference (e.g., a satellite navigation system (SNS) receiver providing position data in the WGS-84 system) and/or relative reference(s) (e.g., accelerometers). When deriving positions, position determination system 330 may utilize a receiver specifically designed for use with the SNS that extracts position, using conventional techniques, from a plurality of signals transmitted by SNS satellites. Various SNS may be used, which typically include a system of transmitters positioned to enable computing device 100 to determine its location based on signals received from the transmitters. In a particular example, such transmitters may be located on Earth orbiting satellites. For example, a satellite in a constellation of Global Navigation System (GNS) such as Global Positioning System (GPS), Galileo, or Glonass may transmit a signal marked with a Pseudorandom Noise (PN) code that may be distinguishable from PN codes transmitted by other satellites in the constellation. Alternatively or additionally, position determination system 330 may use other wireless techniques for determining position, which may include trilateration approaches using wireless local area network (e.g., WiFi) signals, and/or wireless wide area network (e.g., cellular) signals.

Using position determination system 330, computing device 100 may automatically enter privacy display mode based on the position of computing device 100. For example, if computing device 100 is in a particular area which is a known public place, such as, for example, an airport, shopping mall, etc., computing device 100 may automatically enter privacy display mode prior to presenting information on display 120. Accordingly, position determination system 330 may determine a location of computing device 100, and pass this information to processor 310. Processor 310 may then, based upon the determined location, specify that the privacy display mode will be enabled.

Computing device 100 may perform certain operations or processes, as may be described in detail below in FIG. 5. Computing device 100 may perform these operations in response to processor 310 executing software instructions contained in a computer-readable medium, such as system memory 320. A computer-readable medium may be defined as a physical or logical memory device. A logical memory device may include memory space within a single physical memory device or spread across multiple physical memory devices. The software instructions may be read into system memory 320 from another computer-readable medium, such as mass storage device 325, or from another device via connectivity interface(s) 335. The software instructions contained in system memory 320 may cause processor 310 to perform operations or processes described below. Alternatively, hardwired circuitry may be used in place of or in combination with software instructions to implement processes consistent with the principles of the embodiments. Thus, exemplary implementations are not limited to any specific combination of hardware circuitry and software.

The configuration of components of computing device 100 illustrated in FIG. 3 is for illustrative purposes only. It should be understood that other configurations may be implemented. Therefore, computing device 100 may include additional, fewer and/or different components than those depicted in FIG. 3.

Figure 4:
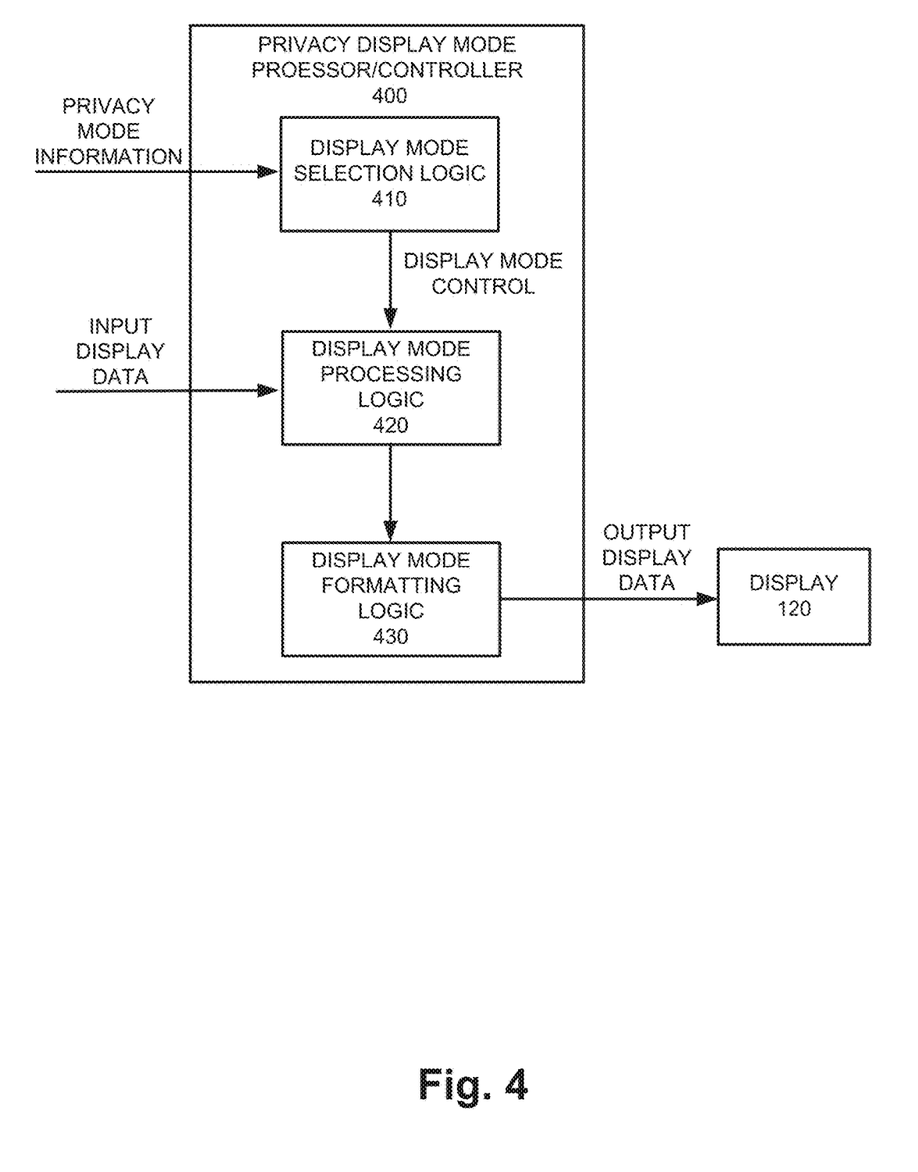
FIG. 4 is a diagram of showing exemplary functional components of a privacy display mode processor/controller for the computing device of FIG. 1.

FIG. 4 is a diagram of showing exemplary functional components of a privacy display mode processor/controller 400 for the computing device of FIG. 1. The functional components of processor/controller 400 may be implemented, for example, via processor 310 executing instructions from memory 320, or a graphics processor (not shown), or a combination thereof. Alternatively, some or all of the functional components of processor/controller 400 may be implemented via hard-wired circuitry. As shown in FIG. 4, display mode controller 400 may include display mode section logic 410, display mode processing logic 420, and display mode formatting logic 430.

Display mode selection logic 410 may receive privacy mode information indicating input display data should be displayed in privacy display mode. The privacy mode information may include a command, which may be manually entered by the user (for example, via a switch or button on computing device 100), and/or other information which may cause computing device 100 to automatically enter the privacy display mode. Display mode selection logic 410 may act on the privacy mode information and have computing device 100 enter the privacy display mode if appropriate. This would include providing an indication to display mode processing logic 420 to process the input display data accordingly. As will be explained in more detail in relation to FIG. 5, privacy mode information may include metadata describing information about the input display data, location information of the computing device, the identity of user of computing device 100 (for multi-user devices), etc.

Display mode processing logic 420 may receive the input display data generated by applications running on computing device 100, and process the input display data in accordance with the display privacy mode indicated by display mode selection logic 410. For example, if the privacy display mode has been entered, display mode processing logic 420 may invert pixels in sub-areas associated with a polarization, and not invert pixels associated with sub-areas associated with the opposite polarization. To improve obscuring private information, display mode processing logic 420 may further take into account neighboring pixels in adjacent sub-areas, and apply filtering techniques, to better obscure information content. Also, gamma processing and/or other display calibration aspects may taken into account when processing the input display data for privacy display mode. Additionally, when appropriate, resolutions and/or sampling densities of the input display data may be altered to facilitate obscuring information content in privacy display mode. For example, if low resolution images are being displayed, the resolution may be up-sampled so the eye may better average the inverted pixels with the non-inverted pixels, to better obscure sensitive information content. Display mode processing logic 420 may pass on the processed image data to display mode formatting logic 430. Display mode formatting logic 430 may generate output display data which may be provided to display 120.

Although FIG. 4 shows exemplary functional components of computing device 100, in other implementations, computing device 100 may include fewer functional components, different functional components, differently arranged functional components, or additional functional components than depicted in FIG. 4. Additionally or alternatively, one or more functional components of privacy display mode processor/controller 400 may perform functions described as being performed by one or more other functional components of privacy display mode processor/controller 400.

Figure 5:
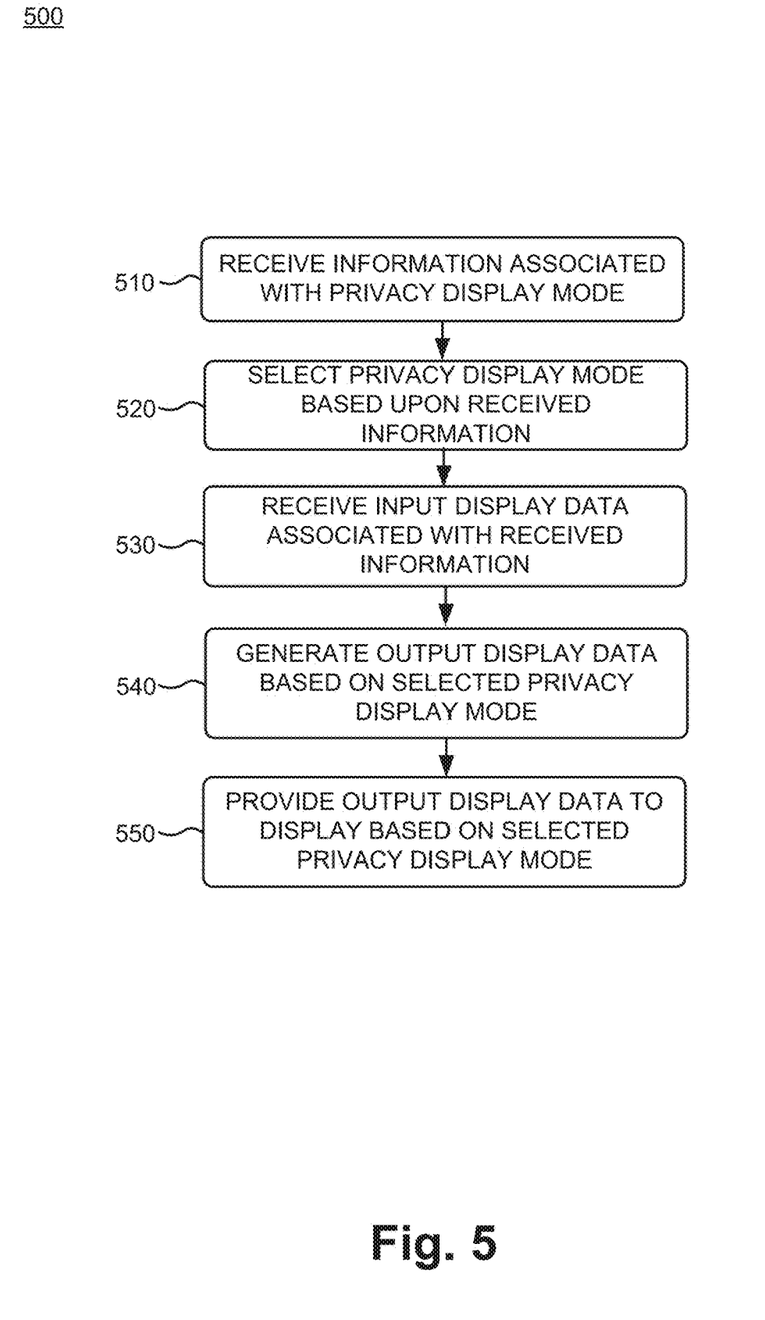
FIG. 5 is a flowchart of an exemplary process for a switchable privacy mode display.

FIG. 5 is a flowchart of an exemplary process 500 for a switchable privacy mode display. Process 500 shown in FIG. 5 may be performed by computing device 500 using, for example, processor 310 in conjunction with instructions stored in system memory 320.

Computing device 100 may initially receiving information specifying a privacy display mode (Block 510), and subsequently select the privacy display mode based upon the received information (Block 520). The received information may include a command to instruct computing device 120 to enter the privacy display mode, and then specify, in response to the received command, that the privacy display mode will be enabled. In an embodiment, the received command may include a remote command over a network, by instigation of a network operator, or a remote device. In another embodiment, receiving information specifying a privacy display mode may include determining a location of computing device 100 using position determination system 330, and then specifying, in response to the determined location, that the privacy display mode will be enabled.

In another embodiment, receiving information specifying a privacy display mode may include computing device 100 determining a file type and/or application type, such as a work or company related file or application, a financial file, or application, etc., associated with the input display data. Computing device 100 may then specify, in response to the determined file type and/or application type, that the privacy display mode will be enabled.

In another embodiment, receiving information specifying a privacy display mode may include computing device 100 identifying metadata associated with the input display data, and specify, in response to the identified metadata, that the privacy display mode will be enabled. The metadata may include any information regarding the information content to be presented on display 120, and may include, for example, information indicating the sensitivity of the information content, information regarding the identity of a sender and/or receiver (for multi-user devices) of the information content, information regarding the time the content was sent and/or received, information regarding the age-appropriate nature of the information content, and/or information identifying an organization associated with the information content.

In another embodiment, receiving information specifying a privacy display mode may include computing device 100 wirelessly detecting other computing devices within a specified distance of the computing device, and then computing device 100 specifying, in response to detecting the second computing device, that the privacy display mode will be enabled.

In another embodiment, receiving information specifying a privacy display mode may include computing device 100 utilizing camera 150 to capture image data of the user. Processor 310 may then receive the camera image data representing a user, and identify whether the user is wearing polarized glasses 175. The processor 310 may then specify, in response to identifying that the user is wearing polarized glasses 175, that the privacy display mode will be enabled.

Further referring to FIG. 5, computing device 100 may then receive input display data configured to represent information for visual interpretation (Block 530). Once received, the input display data may be processed by computing device 100 to generate output display data (Block 540). In response to the selection of the privacy display mode in Block 520, computing device 100 may invert a first portion of pixels in the input display data which are associated with a first polarization, and not invert a second portion of pixels in the input display data which are associated with a second polarization (Block 540).

Once the output display data is generated, processor 310 may provide the output display data to display 120 based on the selected privacy display mode (Block 550). The information represented in the input display data may be conveyed to output display data so that it can be interpretable or understood only when viewing the output display data on display 120 through polarized glasses 175. In other words, for example, only the second polarization may be visible by viewing the output display data through polarized glasses, so the information for display is recognizable. For example, if the output display data represents an image, the user will easily be able to recognize the image. Alternatively, if the output data is text, the user will be able to easily read the text.

In the preceding specification, various implementations have been described with reference to the accompanying drawings. It will, however, be evident that various modifications and changes may be made thereto, and additional implementations may be provided, without departing from the broader scope of the invention as set forth in the claims that follow. The specification and drawings are accordingly to be regarded in an illustrative rather than restrictive sense.

For example, while series of blocks have been described with respect to FIG. 5, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to realize these systems and methods is not limiting of the exemplary implementations. Thus, the operation and behavior of the devices and methods were described without reference to the specific software code, whereas it is understood that software and control hardware can be designed to implement the devices and methods based on the description herein.

Further, certain portions, described above, may be implemented as a component that performs one or more functions. A component, as used herein, may include hardware, such as a processor, an Application Specific Integrated Circuit (ASIC), or a Floating Point Gate Array (FPGA), or a combination of hardware and software (e.g., a processor executing software).

The terms "comprises"/"comprising" when used in this specification are taken to specify the presence of stated features, integers, steps or components but does not preclude the presence or addition of one or more other features, integers, steps, components or groups thereof. Further, the term "exemplary" (e.g., "exemplary implementation," "exemplary configuration," etc.) means "as an example" and does not mean "preferred," "best," or likewise.

No element, act, or instruction used in the present application should be construed as critical or essential to the exemplary implementations unless explicitly described as such. Also, as used herein, the article "a" is intended to include one or more items. Further, the phrase "based on" is intended to mean "based, at least in part, on" unless explicitly stated otherwise.

What is claimed is:

1. A method for selectively displaying content on a computing device, comprising:
   receiving information to specify a privacy display mode;
   selecting the privacy display mode based upon the received information;
   receiving input display data configured to represent information for display;
   generating, in response to selecting the privacy display mode and for every frame of the input display data during the entire time the privacy display mode is selected, a frame of output display data by inverting colors of a first portion of pixels in the input display data which are associated with a first polarization of a display, and not inverting colors of a second portion of pixels in the input display data which are associated with a second polarization of the display;
   providing the output display data to the display, wherein for each frame of the output display data during the entire time the privacy display mode is selected, the inverted output display data of the frame is displayed as part of the same displayed frame with the non-inverted output display data of the frame such that the inverted output display data is displayed by the first portion of pixels and the non-inverted output display data is displayed by the second portion of pixels and the display appears as a gray image to a naked-eye viewer; and
   passing emissions of the display through polarized glasses, the polarized glasses having static polarizers of the second polarization for each eye of a user, the static polarizers of the polarized glasses filtering out the inverted output display data to render the non-inverted output display data recognizable to the user wearing the polarized glasses.

2. The method of claim 1, wherein the receiving information specifying a privacy display mode comprises:
   receiving a command to instruct the computing device to enter the privacy display mode.

3. The method of claim 2, wherein the receiving the command further comprises receiving a remote command over a network.

4. The method of claim 1, wherein the receiving information specifying a privacy display mode comprises:
   determining a location of the computing device; and
   specifying, in response to the determined location, that the privacy display mode will be enabled.

5. The method of claim 1, wherein the receiving information specifying a privacy display mode comprises:
   determining at least one of file type or application type associated with the display data; and
   specifying, in response to the determined at least one of file type or application type, that the privacy display mode will be enabled.

6. The method of claim 1, wherein the receiving information specifying a privacy display mode comprises:
   identifying metadata associated with the input display data; and
   specifying, in response to the identified metadata, that the privacy display mode will be enabled.

7. The method of claim 6, wherein the identifying metadata may comprise: identifying at least one of information indicating sensitivity of information content, information regarding an identity of a sender or receiver of the information content, information regarding a time the information content was sent or received, information regarding an age-appropriate nature of the information content, or information identifying an organization associated with the information content.

8. The method of claim 1, wherein the receiving information specifying a privacy display mode comprises:
   wirelessly detecting a second computing device within a specified distance of the computing device; and
   specifying, in response to detecting the second computing device, that the privacy display mode will be enabled.

9. The method of claim 1, wherein the receiving information specifying a privacy display mode comprises:
   receiving camera image data representing the user;
   identifying whether the user is wearing the polarized glasses; and
   specifying, in response to identifying that the user is wearing the polarized glasses, that the privacy display mode will be enabled.

10. A display system, comprising:
    a computing device, comprising:

a display comprising a striped polarizer, wherein the striped polarizer comprises a plurality of first sub-areas having a first polarization interspersed between a plurality of second sub-areas having a second polarization, wherein each first sub-area is located adjacent to each second sub-area to provide an alternating polarization across a dimension of the display;
a memory configured to store instructions; and
at least one processor, coupled to the display and the memory, wherein the at least one processor is configured to execute the instructions stored in the memory to:
receive information specifying a privacy display mode,
select the privacy display mode based upon the received information,
receive input display data configured to represent information for display,
generate, in response to selecting the privacy display mode and for every frame of the input display data during the entire time the privacy display mode is selected, a frame of output display data by inverting colors of a first portion of pixels in the input display data which are associated with the first polarization of the display, and not inverting colors of a second portion of pixels in the input display data which are associated with the second polarization of the display, and
provide the output display data to the display, wherein for each frame of the output display data during the entire time the privacy display mode is selected, the inverted output display data of the frame is displayed as part of the same displayed frame with the non-inverted output display data of the frame such that the inverted output display data is displayed by the first portion of pixels and the non-inverted output display data is displayed by the second portion of pixels and the display appears as a gray image to a naked-eye viewer; and
polarized glasses having static polarizers of the second polarization for each eye of a user, the static polarizers of the polarized glasses filtering out the inverted output display data to render the non-inverted output display data recognizable to the user wearing the polarized glasses.

11. The display system of claim 10, wherein each of the plurality of first sub-areas and each of the plurality of second sub-areas extend substantially over a vertical dimension of the display, and extend at least one pixel in a horizontal dimension.

12. The display system of claim 10, wherein each first sub-area and each second sub-area extend substantially over a horizontal dimension of the display, and extend at least one pixel in a vertical dimension.

13. The display system of claim 10, wherein the first polarization is polarized in a first direction, and the second polarization is polarized in a direction opposite to the first direction.

14. The display system of claim 13, wherein the first polarization and the second polarization are circular polarizations.

15. The display system of claim 10, wherein the computing device further comprises a camera coupled to the at least one processor, wherein the receiving information specifying a privacy display mode further cause the at least one processor to:
receive camera image data representative of the user,
identify whether the user is wearing the polarized glasses, and
specify, in response to identifying the user is wearing the polarized glasses, that the privacy display mode will be enabled.

16. The display system of claim 10, wherein the computing device further comprises at least one connectivity interface coupled to the at least one processor, wherein the receiving information specifying a privacy display mode further cause the at least one processor to:
wirelessly detect a second computing device within a specified distance of the computing device, and
specify, in response to detecting the second computing device, that the privacy display mode will be enabled.

17. The display system of claim 10, wherein the computing device further comprises a position determination system coupled to the at least one processor, wherein the receiving information specifying a privacy display mode further cause the at least one processor to:
determine a location of the computing device using the position determination system, and
specify, in response to the determined location, that the privacy display mode will be enabled.

18. A method for selectively displaying content on a computing device, comprising:
receiving input display data configured to represent information for display;
providing the input display data to a display and displaying the input display data with the display, wherein corresponding emissions of the display are viewable to a user at a full resolution;
receiving information to specify a privacy display mode;
selecting the privacy display mode based upon the received information;
generating, in response to selecting the privacy display mode and for every frame of the input display data during the entire time the privacy display mode is selected, a frame of privacy output display data by inverting colors of a first portion of pixels in the input display data which are associated with a first polarization of the display, and not inverting colors of a second portion of pixels in the input display data which are associated with a second polarization of the display;
providing the privacy output display data to the display for the entire time the privacy display mode is selected, wherein for each frame of the privacy output display data, the inverted privacy output display data of the frame is displayed as part of the same displayed frame with the non-inverted privacy output display data of the frame such that the inverted privacy output display data is displayed by the first portion of pixels and the non-inverted privacy output display data is displayed by the second portion of pixels and the display appears as a gray image to a naked-eye viewer; and
passing emissions of the display through polarized glasses, the polarized glasses having static polarizers of the second polarization for each eye of a user, the polarizers of the polarized glasses filtering out the inverted privacy output display data to render the non-inverted privacy output display data recognizable to the user while wearing the polarized glasses, wherein the non-inverted privacy display data is viewable by the user via the polarized glasses at a reduced resolution relative to the displaying of the input display data.

19. The method of claim 1, wherein the colors of the first portion of pixels in the input display data are inverted by using complementary colors.

20. The method of claim 1, wherein the input display data represents a grayscale image and each pixel of the first portion of pixels in the input display data is inverted by subtracting a given pixel value from a maximum grayscale value based on a format in which each pixel's data is represented.

* * * * *